United States Patent
Yates et al.

(10) Patent No.: US 10,350,651 B2
(45) Date of Patent: Jul. 16, 2019

(54) APPARATUS AND METHOD FOR CLEANING TRASH CONTAINERS

(71) Applicants: David M. Yates, Albuquerque, NM (US); Rick L. Yates, Albuquerque, NM (US)

(72) Inventors: David M. Yates, Albuquerque, NM (US); Rick L. Yates, Albuquerque, NM (US)

( * ) Notice: Subject to any disclaimer, the term of this patent is extended or adjusted under 35 U.S.C. 154(b) by 251 days.

(21) Appl. No.: 14/965,243

(22) Filed: Dec. 10, 2015

(65) Prior Publication Data

US 2016/0199890 A1 Jul. 14, 2016

Related U.S. Application Data

(60) Provisional application No. 62/101,325, filed on Jan. 8, 2015.

(51) Int. Cl.
| | | |
|---|---|---|
| *B08B 3/14* | (2006.01) | |
| *B07B 1/10* | (2006.01) | |
| *B08B 9/08* | (2006.01) | |
| *B65F 7/00* | (2006.01) | |
| *C02F 9/00* | (2006.01) | |
| *B01D 21/02* | (2006.01) | |

(52) U.S. Cl.
CPC .............. *B08B 3/14* (2013.01); *B07B 1/10* (2013.01); *B08B 9/0826* (2013.01); *B65F 7/005* (2013.01); *C02F 9/00* (2013.01); *B01D 21/02* (2013.01); *B07B 2230/01* (2013.01); *B08B 2203/0229* (2013.01)

(58) Field of Classification Search
CPC ......... B08B 9/093; B08B 3/14; B08B 9/0826; B08B 3/02; B08B 3/00; B08B 9/00; B08B 9/0804; B08B 9/0813; B08B 9/0821; B08B 9/083; B01D 21/2455; B01D 21/2472
See application file for complete search history.

(56) References Cited

U.S. PATENT DOCUMENTS

| | | | | | |
|---|---|---|---|---|---|
| 2,821,961 | A | * | 2/1958 | Mercoli ................. | A01K 39/01 119/57.92 |
| 3,795,316 | A | * | 3/1974 | Wood .................. | B01D 21/0012 210/298 |
| 7,500,566 | B2 | * | 3/2009 | Smith ....................... | B03B 5/40 209/17 |
| 7,846,263 | B1 | * | 12/2010 | Marcantel ............... | B08B 9/093 134/104.2 |
| 8,603,256 | B2 | * | 12/2013 | Shuman ................ | B08B 9/0821 134/10 |
| 2002/0185422 | A1 | * | 12/2002 | Turner, Jr. ......... | B01D 21/0012 210/162 |
| 2004/0222167 | A1 | * | 11/2004 | Weir ....................... | B01D 29/01 210/767 |
| 2006/0042660 | A1 | * | 3/2006 | Byers .................... | B08B 9/0826 134/22.1 |
| 2008/0116151 | A1 | * | 5/2008 | Suthard .................... | E02B 5/08 210/791 |
| 2014/0021148 | A1 | * | 1/2014 | Buckner ............ | B01D 21/0039 210/801 |
| 2016/0199890 | A1 | * | 7/2016 | Yates ....................... | B08B 3/14 134/10 |

* cited by examiner

*Primary Examiner* — Sharidan Carrillo

(57) ABSTRACT

An apparatus for cleaning trash containers after emptying of solid refuse by spraying a solution into inverted containers at a high pressure from a nozzle to remove the residue.

5 Claims, 8 Drawing Sheets

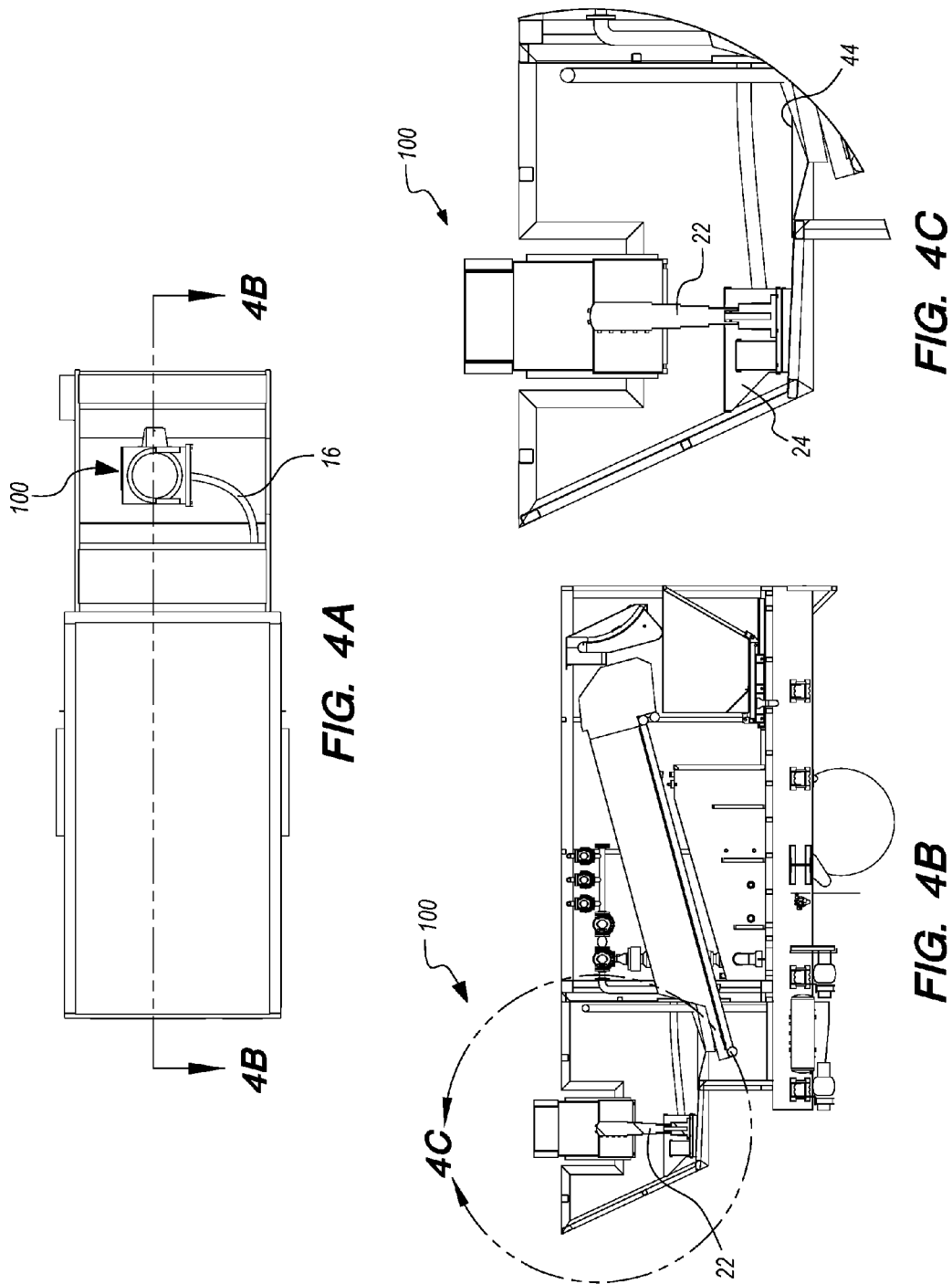

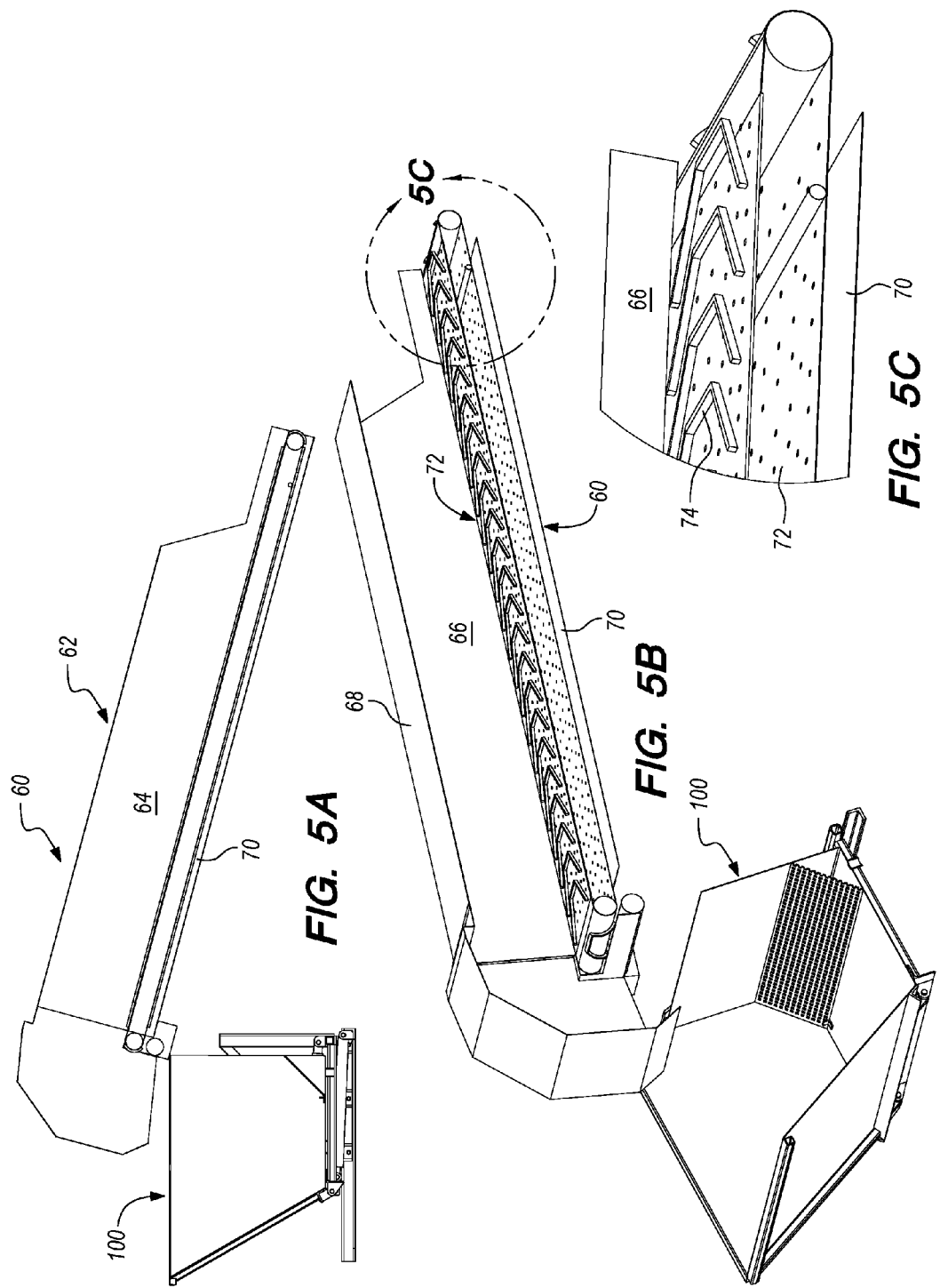

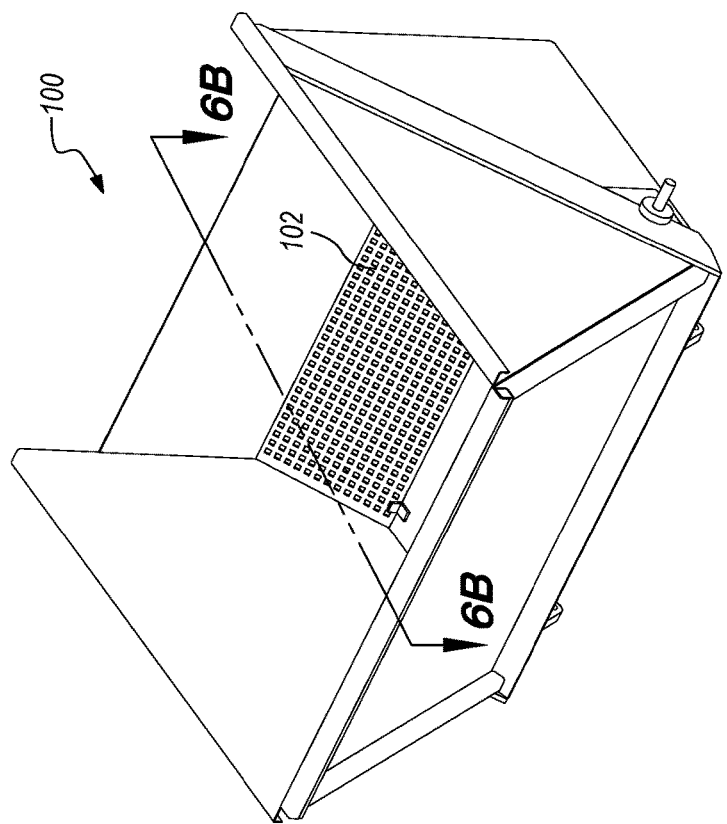
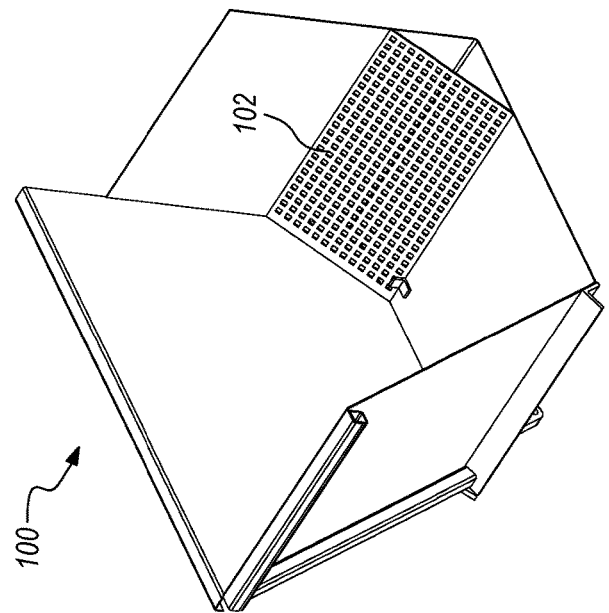
FIG. 6A
FIG. 6B

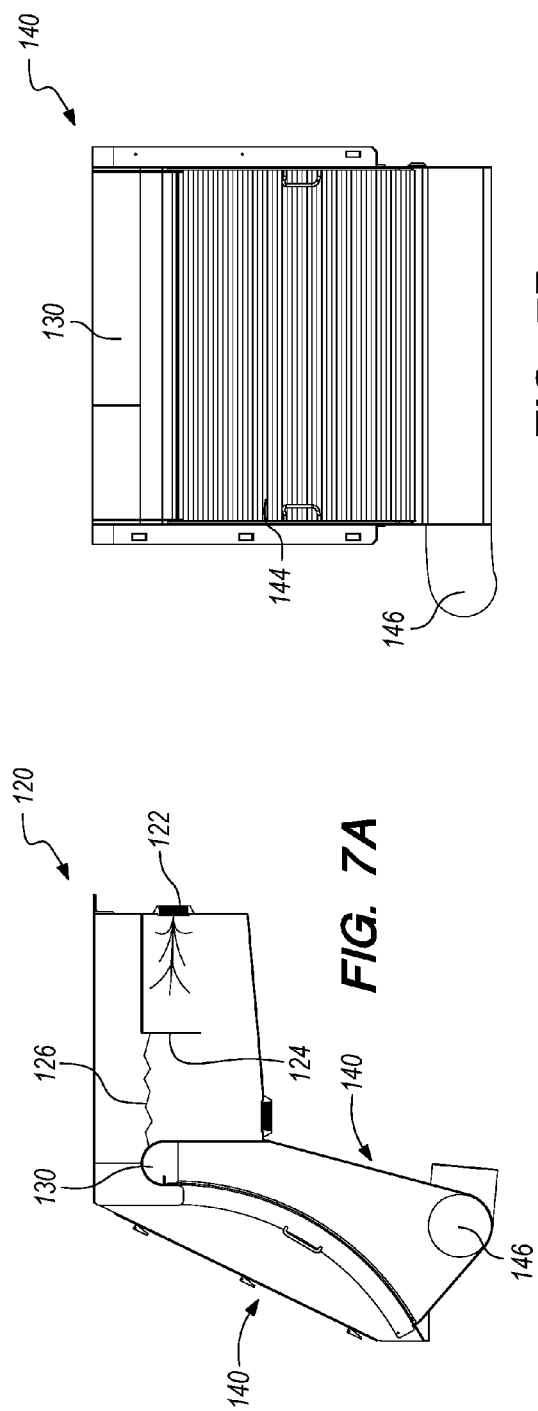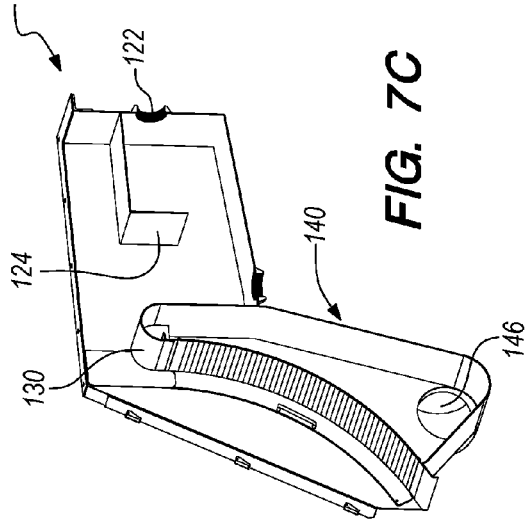

APPARATUS AND METHOD FOR CLEANING TRASH CONTAINERS

CROSS REFERENCE TO RELATED APPLICATIONS

This patent application claims priority to provisional patent application No. 62/101,325 filed Jan. 8, 2015.

INCORPORATION-BY-REFERENCE-OF-MATERIAL

This patent application incorporates by reference all of the subject matter of provisional patent application No. 62/101,325 filed Jan. 8, 2015.

BACKGROUND OF THE INVENTION

Technical Field

The present invention relates to protection of the environment by assuring that garbage collection procedures in urban and suburban areas maintain trash containers in a proper sanitary condition.

Background Art

Various municipal garbage collection systems provide garbage or trash containers to residential and commercial sites for their continuous use. Trash containers are typically 3 to 4 feet high with a rectangular cross-section of several feet per side and a hinged lid. The container may be provided with some fixed attachment device or is structurally sufficient so as to permit a garbage or refuse truck, having a chamber into which the refuse is dumped, to grasp the container, lift it above a dump area of the chamber, invert the container to permit the trash or refuse to drop by gravity from the container into the dump area, and then return the container to the spot at which it was grasped. Garbage trucks with these capabilities are well-known in the art and include various methods for grasping and manipulating the trash containers. Trash containers are typically permanently assigned to a residential or commercial location until they are retired and therefore accumulate residue over a period of time.

Currently, for environmental reasons, some municipalities provide several discrete containers to each location, each container dedicated to a particular type of refuse, such as recyclable materials or organic waste. Others provide only a single container that collects all types of refuse other than chemicals or other potentially dangerous materials. In either system, there is at least one container with perishable organic refuse, such as food leftovers, that leave a residue even after the larger contents are dumped. In many instances the refuse is wet, heavy organic biodegradable material that is later decomposed by common bacteria at a garbage collection site. Trash containers that have organic residue are subject to various unhealthy materials such as mold, fungus and harmful bacteria. The organic material may adhere to the sides and bottom of the container even after repeated dumpings. This residue leads to undesirable odors that accumulate over time. More importantly, the fungus, mold or bacteria may be detrimental to persons with certain allergies or weakened immune systems, like children.

Some attempts to overcome the health hazards of organic refuse has been to spray container contents, after it has been dumped into the truck refuse holding chamber with a disinfectant that reduces the smell if not the health hazard. However, that does not address the problem of the accumulating organic residues that adhere to the inside surfaces of the trash containers. It has been found that some container users are sensitive to the problem described and attempt to clean the inside of the containers with water from a garden hose or with a disinfectant spray; however, there is no place to capture the dislodged residue which often is simply dumped out into the street, ineffectively dealing with problem.

The problem is exacerbated by present garbage collection methods that must be cost-effective. It is common for refuse collection systems to employ a fleet of trucks that are deployed to multiple areas of a municipality or county, such as residential neighborhoods, requiring the container users to place the container at a street accessible location where a garbage truck may approach the full container and facilely grasp the container and quickly empty its contents in the manner described above. It is impractical to equip every garbage truck with an apparatus for not only holding the refuse from full containers but also to clean the interior of the container. The cleaning apparatus is bulky as will be described and adding it to the collection vehicle would decrease the holding chamber capacity for the collected material or enlarge the truck to a size that would limit maneuverability. Moreover, the waste material that is ejected must be collected in the cleaning apparatus and the liquid material is desirably filtered and re-used rather than requiring a new batch of solution or water to be supplied after the washing of a number of separate trash containers that would be inefficient and cumbersome. The cost and efficiency criterion for the collection vehicles is also applicable to any system or apparatus for cleaning the trash containers.

A potential solution for the above described problems and challenges would be to provide a separate vehicle, equipped with a cleaning apparatus for trash containers, that would follow collection vehicles on a periodic basis and clean the containers.

U.S. Pat. Nos. 6,336,239, 5,964,229 and 4,485,513 show various trash container cleaning systems.

BRIEF SUMMARY OF THE INVENTION

It is therefore a primary object of the present invention to provide a trash container cleaning apparatus, that may be mobile, including a fluid nozzle mounted in a housing for discharging a solution at a high pressure into an inverted trash container, a catch basin for receiving solid refuse and dirty solution that has been unloosened from the trash container walls and bottom, a conveyor having one end portion below an opening in the bottom of the catch basin and onto which the solid refuse and dirty solution is deposited allowing the dirty solution with smaller solid refuse to be returned to a sump and larger solid refuse to be dumped into a waste bin located beneath the opposite end of the conveyor; a stilling tank that receives the dirty solution and smaller refuse from the sump allowing some portion of the smaller refuse to settle to the bottom of the tank; a screen receiving overflow solution and unsettled solid refuse from the stilling tank allowing the unsettled solid refuse to be separated from the solution and deposited into the waste bin; and a vessel for holding clean solution initially and after filtering by the apparatus described.

BRIEF DESCRIPTION OF THE SEVERAL VIEWS OF THE DRAWINGS

FIG. 4A is a plan view of the apparatus showing a trash container in a cleaning position;

FIG. 4B is a side view of the apparatus with the nozzle housing cutaway;

FIG. 4C is an enlarged partial section view of the nozzle and inverted container;

FIG. 5A is a side view of a conveyor and a waste bin;

FIG. 5B is a perspective sectional view of the conveyor together with the waste bin;

FIG. 5C is an enlarged sectional view of a portion of one end of the conveyor;

FIG. 6A is a perspective view of the waste bin;

FIG. 6B is a sectional view of the waste bin along the plane 6B-6B;

FIG. 7A is a side sectional view of a stilling tank and a screen system;

FIG. 7B is a front view of the screen system and a weir;

FIG. 7C is a perspective sectional view of the stilling tank and screen system.

DETAILED DESCRIPTION OF ONE EMBODIMENT OF THE INVENTION

The term "trash container" includes as synonyms: garbage can, trash bin, refuse container, rubbish bin and like terms.

The present invention is particularly directed at cleaning trash containers by a mobile vehicle that may be self-powered, similar to a familiar trash collection truck, or, drawn as a trailer, or any other vehicle that may be driven on typical streets, roads and alleys. However, the apparatus may also be used as a stationary cleaning system where trash containers are transported, from locations where they are used to collect trash, to a location where they may be cleaned by the apparatus and later re-transported to the user. The embodiment disclosed is a truck on which the apparatus is mounted; the truck follows a trash collection vehicle and cleans containers after the bulk of their refuse contents has been dumped.

Figure 1:
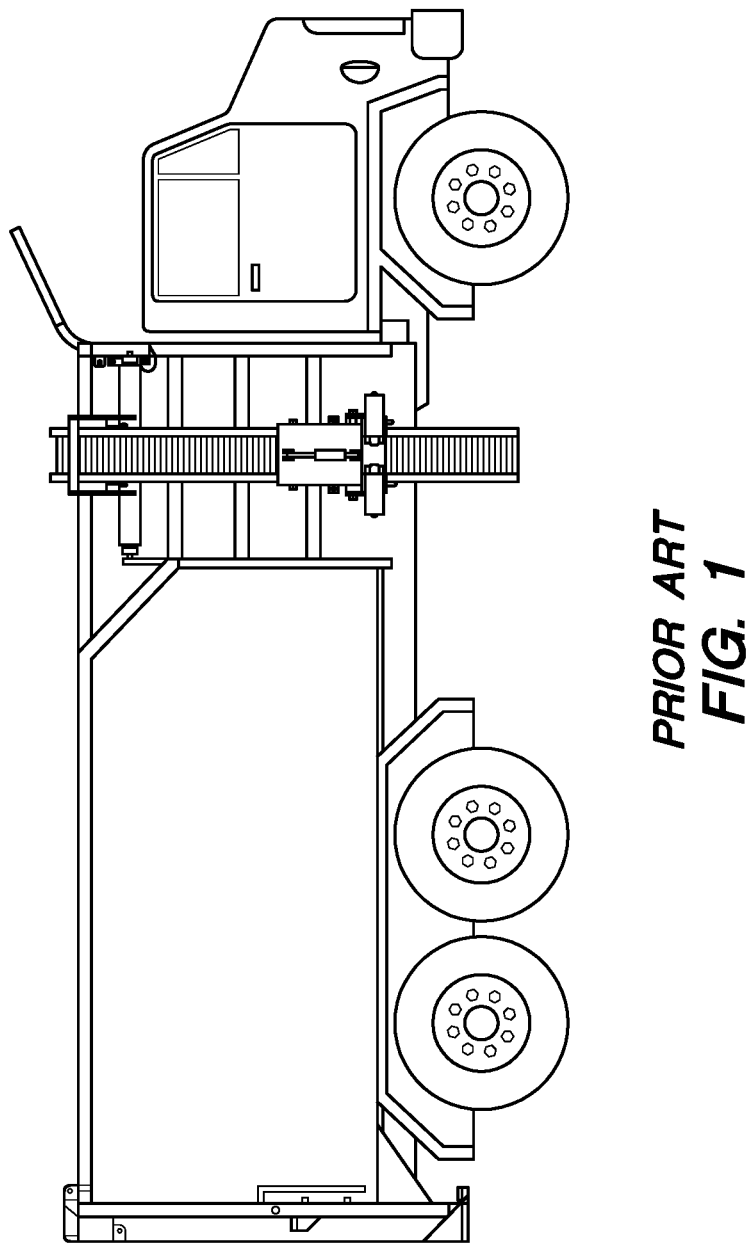
FIG. 1 is a depiction of a prior art trash collection vehicle with a trash container loading arm.

FIG. 1 shows a trash collection vehicle in the prior art as described in U.S. Pat. No. 6,494,665. Attention is drawn to the subassembly for grasping, lifting, inverting and replacing a trash container on the ground at the location where it has been picked up. Such subassembly is often referred to in the art as a loading arm. Loading arms may be of various configurations known in the art. As explained in the above-identified patent, and many other patents, loading arms function to manipulate a trash container in the manner described above. The purpose of disclosing this prior art loading arm is to enable an understanding of how a trash container is manipulated to present it for cleaning as shown in FIGS. 4A, 4B, and 4C.

Figure 2:
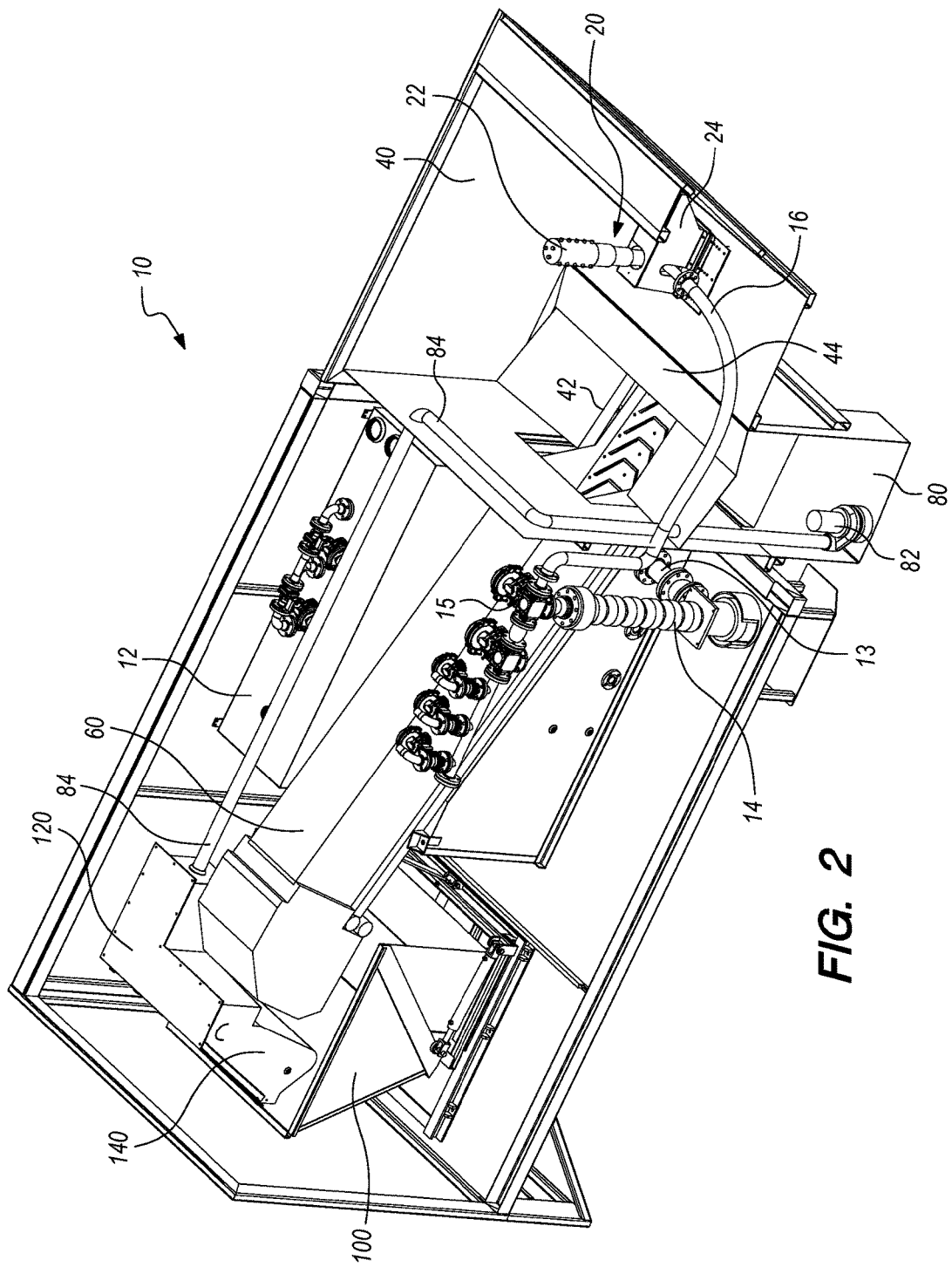
FIG. 2 is a perspective view of the sub-assemblies of a cleaning apparatus constructed in accordance with one embodiment of the present invention.
Figure 3:
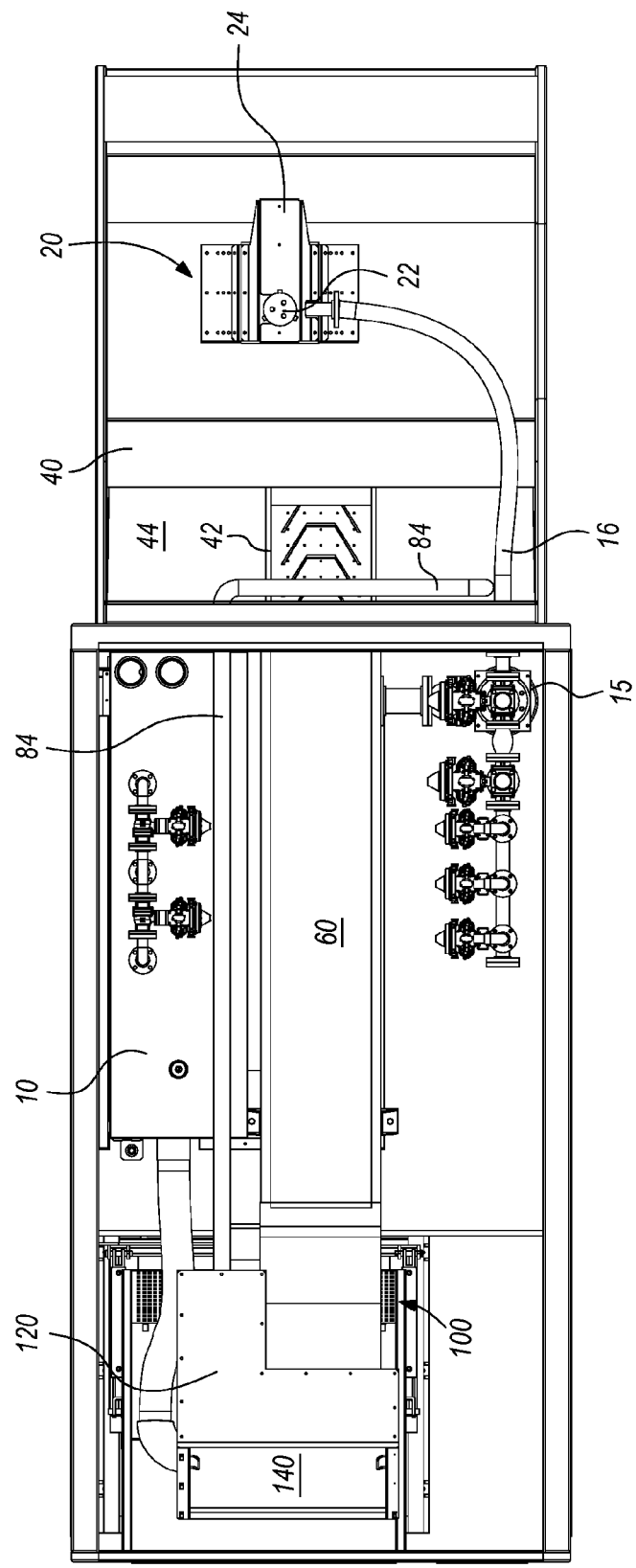
FIG. 3 is a plan view of the cleaning apparatus embodiment with the roof of the apparatus removed.
Figure 8:
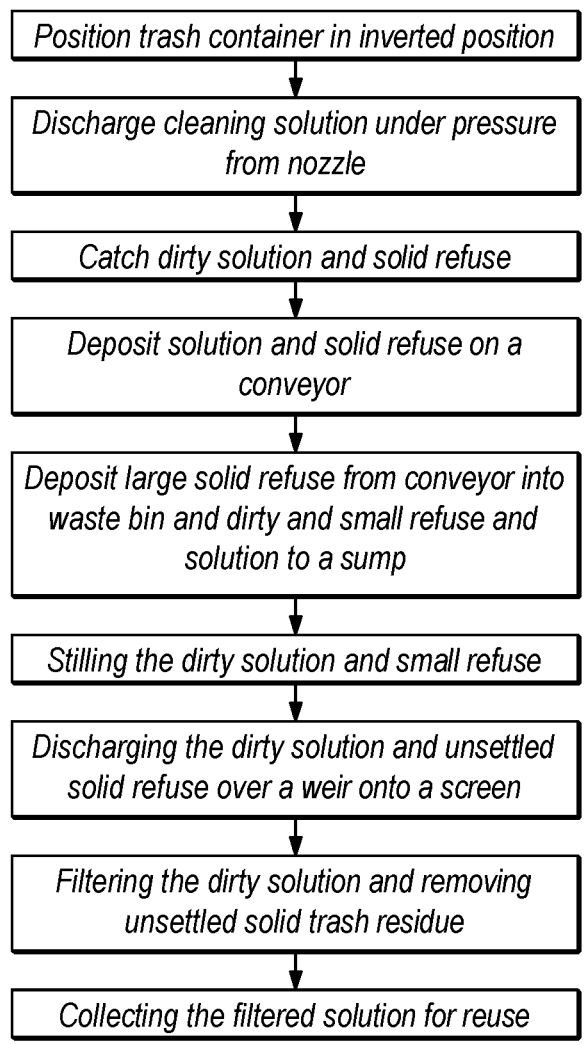
FIG. 8 is a flow diagram of a method as may be practiced by one embodiment of the above-described apparatus.

FIG. 2 is a perspective view of one embodiment of the present invention. Apparatus or system 10 comprises various subassemblies or subsystems including:

clean solution vessel 12;
nozzle spray subsystem 20;
housing section 40 for the nozzle spray subsystem 20;
conveyor subassembly 60;
sump subassembly 80;
waste bin 100;
stilling tank subassembly 120; and
screen subassembly 140.

Each of these subsystems and/or subassemblies are described in detail below prior to describing the operation of the complete apparatus or system and the method for cleaning trash containers in accordance with one embodiment of the present invention. One of ordinary skill in the art will understand that the apparatus is mounted on the rear portion of a truck frame and generally comprises a structure and housing that contains, supports, positions and integrates the various subassemblies and/or subsystems. Further it will be understood that the activating mechanisms of the apparatus may be hydraulic pressure systems that operates subassemblies such as movement of the conveyor and a sump (as will be explained), all under the control of a computer or other computational device that may be dedicated hardware or under the control of software in a manner well known in the art. It will also be understood that the apparatus may automatically perform all of the functions to be described or may be manually or semi-automatically controlled.

Clean solution vessel 12 is an ordinary tank fabricated from metal, plastic, fiberglass, or other structural material capable of holding sufficient solution to clean many trash containers.

The solution may be plain water, potable or non-potable, available at the facility from which the vehicle is dispatched, or, for example, from a fire hydrant or other source. The solution may also be a chemically-based cleaning solution such as a detergent. It will be understood that the trash containers are anticipated to include material that adheres to the trash container inner walls, such as sticky or gooey substances, the residue of organic foods, and other materials that must be forcefully ejected. Furthermore, the container may include organic residue that contains bacteria, or other microbes that are potentially dangerous to health and desired levels of hygiene. The solution therefore may contain various disinfectants or other chemicals that destroy or enervate unhealthy microbes. In short, various solutions may be utilized in the apparatus as may be chosen by the operator of the trash system. Vessel 12 has an output pipe 13 connected to high pressure pump 14, that provides solution at high pressure through valve 15 and pipes 16 to nozzle spray system 20.

Nozzle spray subsystem 20 includes telescopic nozzle 22 that is vertically mounted on a stand or base 24. Nozzle 22 has ejection or spray ports in the upper surface and on the sidewalls of the nozzle telescopic sections. As seen best in FIGS. 4A, 4B, and 4C, that shows the trash container held in the inverted vertical position for cleaning by the loading arm, the nozzle 22 extends deep into the container so that the high pressure spray will loosen and eject refuse residue from the walls and bottom of the container. Those skilled in the art will appreciate that various types and numbers of nozzles may be used to perform the cleaning, that additional nozzles may be placed so as to spray the external surfaces of the container, and that the nozzle may be designed so that various amounts and types of solution may be discharged from different nozzle openings at various pressures.

Spray nozzle subsystem 20 is positioned in a section 40 of the housing apparatus 10 so that refuse residue may fall by gravity into a catch basin 44 of the housing section 40 so as to concentrate the refuse. The refuse from the trash container may include trash of various size and weight, it being understood that when a trash container is emptied during the garbage collection phase some items of appreciable size and weight may be left because they were temporarily attached to the inner walls of the container or failed to be dumped for other reasons. Accordingly, the refuse collected in the catch basin of the housing section 40 contains dirty solution and solid refuse of various sizes and weights. The catch basin of the housing section includes an opening 42 that is positioned above one end of conveyor subassembly 60.

Conveyor subassembly 60 has one end exposed below the opening 42 in catch basin 44. In the embodiment shown, the conveyor subassembly may be slantingly mounted at an angle to the horizontal. In such case, the lower end of the conveyor subassembly is positioned below opening 42 in catch basin 44. The conveyor subassembly is best seen in FIGS. 5A, 5B, and 5C to which attention is now directed. The subassembly includes a housing 62 having sidewalls, 64, 66, top wall 68, and bottom wall 70. Positioned within the conveyor housing 62 is a moving conveyor belt 72 for transporting larger solid refuse to the upper end of the conveyor subassembly where it is discharged into waste bin 100. Conveyor belt 72 is perforated with round or other configured holes through which dirty solution and smaller solid refuse may fall. Belt 72 may also be provided with chevron-like projections 74 to catch and retain the larger solid refuse during movement to the top of the conveyor subassembly 60. The purpose of the perforations is to allow the dirty solution and smaller solid refuse to drop to the bottom of the housing onto bottom wall 70 that permits the dirty solution and smaller refuse to slide down the bottom wall 70 into sump subassembly 80 (see FIG. 1).

Sump subassembly 80 is positioned below the lower end of the conveyor subassembly and the bottom wall 44 of housing section 40 and collects dirty solution from the opening 42 in the catch basin 44 that does not fall onto and remain on the conveyor. Additionally, the dirty solution discharged from the conveyor bottom wall 70 together with smaller solid refuse is collected in sump subassembly 80. A scavenger pump 82 is mounted in sump 80 and intakes the dirty solution and smaller solid refuse. Pump 82 is connected through pipes 84 to stilling tank subassembly 120.

Stilling tank subassembly 120 is best illustrated in FIGS. 7A, 7B, and 7C. The rear wall of the stilling tank has a pipe connection 122 through which the dirty solution and smaller solid refuse is received. The solution with the entrained smaller size solid refuse enters under considerable pressure and the tank is provided with a wall 124 that slows the entering solution velocity or flow rate so as to mitigate disruption or disturbance of the dirty solution and refuse already in the tank. The level of solution in the tank during operation is diagrammatically shown at 126 in FIG. 7A. The smaller solid refuse in the dirty solution in tank 120 settles to the bottom of the tank where it may be removed at the end of a cleaning run or periodically depending on the extent of solid refuse in the containers cleaned. The unsettled solid material is still smaller than the smaller solid refuse received from the sump. One of the four vertical walls of the stilling tank 120 is shorter than the other walls and defines a weir 130 that allows dirty solution and unsettled solid refuse to pour over the weir onto a screen subassembly 140 when the stilling tank level of solution reaches the edge of the weir.

The screen subassembly 140 of the present embodiment preferably utilizes the Coanda effect, a physical phenomenon of moving fluid well known in the art, although other types of screens or filters may be used. Coanda screens may be obtained from: Industrial Screen Products, Inc. Placerville, Calif.; Cook Legacy Water & Energy California, a Unit of Norris Screen and Manufacturing, Pickerington Ohio; or Aquashear Coanda Screens, Machynlleth, Powys, Wales. The screen subassembly includes a screen 144 attached at its upper end to the edge of the weir 130 and presents a sloping surface that allows the unsettled solid refuse or particulate in the dirty solution to be collected on the surface and slide down the surface by gravity into the waste bin 100. The filtered clean solution that passes through the screen is collected in the lower portion of the screen subassembly and is transported through pipe 146 to the clean solution vessel 12 for subsequent use.

The waste bin 100 is shown particularly in FIGS. 6A and 6B. The waste bin catches the larger solid refuse as above described that falls from the top edge of the conveyor belt. It also catches the unsettled solid refuse or residue that is deposited from the Coanda screen. The waste bin 100 includes a screen 102 that allows dirty solution, but not the larger solid refuse or unsettled solid refuse from the screen sub-assembly to pass through a pipe (not shown) to sump subassembly 80.

In operation, the driver of the truck and the apparatus stops the vehicle adjacent a trash container and initiates the method for cleaning the container. The method includes activation of the loading arm to position the trash container in an inverted position. During washing with the solution the arm firmly holds the container to prevent inadvertent release under the high pressure jet spray. While the container is inverted, the nozzle is telescopically raised so to be deep inside the container. The solution is discharged under high pressure to clean the container. Refuse of various size and weight that is residue from earlier collection of refuse from the container by a waste collection vehicle together with dirty solution is collected in a catch basin. An opening in the catch basin is positioned above one end of a conveyor that is then operative and a portion of the dirty solution and solid refuse will fall onto the conveyor. A portion of the dirty solution will also be carried by the refuse onto the conveyor. The conveyor is provided with perforations. The perforations are sized so that larger solid refuse is carried by the moving conveyor to the opposite end where that solid refuse is removed by depositing it into a waste bin. The solution and smaller solid refuse that passes through the conveyor perforations is returned to and collected in the sump.

A pump in the sump collects the dirty solution and smaller solid refuse and transports it through pipes to a stilling tank where the flow rate may be attenuated so as to minimize disturbance of existing solution in the tank. The smaller solid refuse will settle to the bottom of the tank and unsettled solid refuse will continue to be entrained in the dirty solution. When the dirty solution and unsettled third size solid refuse in the tank rises to the level of a weir that constitutes one edge of the tank wall, the dirty solution and unsettled solid refuse pours over the weir onto a Coanda screen or other type of filtering screen. The unsettled solid trash is collected on the screen that filters the unsettled solid trash from the dirty solution and is removed from the filtered, now clean, solution that may be collected for reuse.

It is an objective of the invention to provide a method and apparatus that progressively filters and cleans the refuse and solution for re-use to assure that the solution is removing, rather than further contaminating, the refuse. This is desirably accomplished by filtering out increasingly smaller solid matter from the refuse initially discharged from the trash container. It is highly desirable that the refuse can be filtered in a minimum number of steps so as to perform the cleaning operation in a minimum amount of time. The present invention achieves these goals by using several different types of filtering subassemblies or subsystems at various stages of the operation. The first step performed by the conveyor separates and deposits the bulky or larger refuse, for example, cans, cartons or plastic containers into the waste bin. This larger refuse may be characterized as refuse of a first size. The conveyor, as noted, allows the smaller refuse to pass through the belt; this refuse may be referred to as solid refuse of a second size and weight. This second size and weight refuse must be sufficiently small or light that it may be entrained in the dirty solution while transported for further processing. Moreover, the dirty solution that spills directly from the catch basin or slides down from the lower wall of the conveyor is important because it provides the transport carrier for the remaining steps. The third step transports the smaller (second size and weight) solid refuse to the stilling tank where the filtering process continues by relying upon the weight of at least a portion of the refuse to sink or descend to the bottom of the tank. The volume of the stilling tank and the time for settling depends on the weight of the solid smaller refuse and may be found by minor experimentation based on the characteristics of the refuse collected in a particular refuse system. The unsettled solid refuse is still smaller in size and/or weight and may be characterized as a third size of solid refuse. In the final step that is performed by the Coanda screen the remaining refuse, now of a particulate size and or weight (third size) is skimmed from the solution.

The fixed size and weight of the refuse at each step may depend on the particular types of garbage that is placed in the trash containers. It has been found that the approximate size of the perforation holes may be from $1/8$ inch diameter to $1/2$ inch in diameter, but preferably $3/8$ inch diameter or comparable area if the holes are not round. This first stage of separating large solid refuse of a first size from the dirty solution and allowing only smaller solid refuse of a second size to be deposited in the sump depends on the manner in which subsequent steps are performed. For example, if carried by solution from step to step, the size of piping, the solution pressure necessary to create an adequate flow of solution to entrain the solid smaller refuse and other flow parameters for transporting a mixture of solution and solids are known to those of ordinary skill in the art. The quantitative incremental stages of filtering are therefore determined by the particular subassemblies, the refuse type, the time constraints, and the desired level of purity of the re-useable solution.

A preferred embodiment of the invention has been described but it will be understood by those of ordinary skill in the art that modifications may be made without departing from the spirit and scope of the invention of the apparatus and method. Accordingly, it is to be understood that the invention is not to be limited by the specific illustrated and described embodiment but only by the scope of the appended claims.

We claim:

1. A method for cleaning trash containers of solid trash residue comprising grasping, lifting, inverting and holding, and spraying an inside surface of a trash container with a solution and returning the container to the ground after cleaning, further comprising the steps of:
   collecting the solid trash residue loosened from the container and dirty solution after spraying;
   depositing the solid trash residue onto one end of a moving conveyor belt having a plurality of openings and depositing large trash residue in a waste bin from the conveyor belt;
   collecting, in a sump, the dirty solution and smaller trash residue passed through the conveyor belt openings;
   pumping the smaller trash residue and the dirty solution through pipes from the sump to an inlet of a stilling tank;
   attenuating a flow of the smaller trash residue and the dirty solution into the stilling tank by slowing the flow with a wall positioned in the stilling tank between a weir in the stilling tank and the inlet of the stilling tank;
   permitting at least a portion of the smaller trash residue to settle to a bottom of the stilling tank;
   pouring the unsettled smaller trash residue and the dirty solution from the stilling tank over the weir to a filter screen;
   collecting and depositing the unsettled trash residue and the dirty solution on the filter screen to filter the dirty solution;
   removing the unsettled smaller trash residue from the filter screen; and
   collecting the filtered dirty solution for reuse.

2. The method of claim 1 further comprising:
   supporting a telescopic nozzle for discharging the solution under pressure; and
   extending the nozzle from a rest position to an elevated operative position.

3. The method of claim 2 further comprising:
   positioning a catch basin below the nozzle;
   slantingly positioning the conveyor belt with a lower end adjacent the catch basin; and
   enclosing the conveyor belt within a housing.

4. The method of claim 3 further comprising:
   permitting the dirty solution and smaller trash residue to drop onto a bottom wall of the housing; and
   permitting the dirty solution and smaller trash residue to slide down the bottom wall toward the catch basin.

5. The method of claim 4 further comprising:
   positioning the sump below the catch basin and below the lower end of the conveyor belt; and
   receiving in the sump the dirty solution and small trash residue that falls from the lower end of the conveyor belt.

* * * * *